US012754939B2

(12) United States Patent
Jin et al.

(10) Patent No.: US 12,754,939 B2
(45) Date of Patent: Oct. 6, 2026

(54) INFORMATION PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Shixing Jin, Beijing (CN); Leiqi Yao, Beijing (CN); Zhiwei Zhang, Beijing (CN); Chen Ran, Beijing (CN); Mingxin Huang, Beijing (CN); Fan Xu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 42 days.

(21) Appl. No.: 18/789,672

(22) Filed: Jul. 30, 2024

(65) Prior Publication Data

US 2025/0053583 A1 Feb. 13, 2025

(30) Foreign Application Priority Data

Aug. 8, 2023 (CN) ......................... 202310994920.9

(51) Int. Cl.
*G06F 17/27* (2006.01)
*G06F 16/3329* (2025.01)
*H04L 51/02* (2022.01)

(52) U.S. Cl.
CPC .......... *G06F 16/3329* (2019.01); *H04L 51/02* (2013.01)

(58) Field of Classification Search
CPC . H04L 51/02; G06F 16/3329; G06F 3/04883; G06F 9/453; H04M 1/72469; G10L 15/22
USPC ............................................................. 704/9
See application file for complete search history.

(56) References Cited

U.S. PATENT DOCUMENTS

| | | | | |
|---|---|---|---|---|
| 2014/0349628 A1* | 11/2014 | Koh | H04M 1/72469 455/566 |
| 2018/0349791 A1* | 12/2018 | Wang | G06F 9/453 |
| 2023/0033852 A1* | 2/2023 | Avrunin | G10L 15/22 |

FOREIGN PATENT DOCUMENTS

| | | |
|---|---|---|
| CN | 105068661 A | 11/2015 |
| CN | 113468313 A | 10/2021 |
| CN | 114661890 A | 6/2022 |
| CN | 116450010 A | 7/2023 |

OTHER PUBLICATIONS

China Patent Application No. 202310994920.9; Office Action; dated Jul. 31, 2026; 24 pages.

* cited by examiner

*Primary Examiner* — Md S Elahee
(74) *Attorney, Agent, or Firm* — BakerHostetler

(57) ABSTRACT

The present disclosure provides an information processing method and apparatus, an electronic device, and a storage medium. The method includes: acquiring a target functional tool to be displayed and a distribution style of the target functional tool, in which different target functional tools are configured to answer questions in different vertical scenarios, and the distribution style is any one of: including a functional tool identifier and a question sample, and including a functional tool identifier and a multi-round conversation sample; and displaying the target functional tool in a target page according to the distribution style of the target functional tool.

20 Claims, 4 Drawing Sheets

INFORMATION PROCESSING METHOD AND APPARATUS, ELECTRONIC DEVICE, AND STORAGE MEDIUM

CROSS-REFERENCE TO RELATED APPLICATION

This application claims the priority to and benefits of the Chinese Patent Application, No. 202310994920.9, which was filed on Aug. 8, 2023. The aforementioned patent application is hereby incorporated by reference in its entirety.

TECHNICAL FIELD

The present disclosure relates to the technical field of computers, and in particular, to an information processing method and apparatus, an electronic device, and a storage medium.

BACKGROUND

Generally, there are many functions provided in an application. When users open an application, they can use various different functions provided in the application. However, in the related technologies, the display style of functions is relatively single and messy, especially for some new functions, which results in high usage costs for the users and reduces the use efficiency of the functions.

SUMMARY

Embodiments of the present disclosure at least provide an information processing method and apparatus, an electronic device, and a storage medium.

An embodiment of the present disclosure provides an information processing method, including: acquiring a target functional tool to be displayed and a distribution style of the target functional tool, wherein different target functional tools are configured to answer questions in different vertical scenarios, and the distribution style is any one of: including a functional tool identifier and a question sample, and including a functional tool identifier and a multi-round conversation sample; and displaying the target functional tool in a target page according to the distribution style of the target functional tool.

An embodiment of the present disclosure provides an information processing apparatus, including: an acquisition module, configured to acquire a target functional tool to be displayed corresponding to a target page and a distribution style of the target functional tool, wherein different target functional tools are configured to answer questions in different vertical scenarios, and the distribution style is any one of: including a functional tool identifier and a question sample, and including a functional tool identifier and a multi-round conversation sample; and a display module, configured to display the target functional tool in the target page according to the distribution style of the target functional tool.

An optional implementation of the present disclosure also provides an electronic device, including: a processor, and a memory, wherein the memory stores a machine-readable instruction executable by the processor, the processor is configured to execute the machine-readable instruction stored in the memory, and when the machine-readable instruction is executed by the processor, the processor performs steps in any of the possible embodiments.

An optional implementation of the present disclosure also provides a computer-readable storage medium storing a computer program, wherein the computer program, when executed by a processor, implements steps in any of the possible embodiments.

In the embodiment of the present disclosure, it includes: acquiring a target functional tool to be displayed and a distribution style of the target functional tool, wherein different target functional tools are configured to answer questions in different vertical scenarios, and the distribution style is any one of: including a functional tool identifier and a question sample, and including a functional tool identifier and a multi-round conversation sample; and displaying the target functional tool in a target page according to the distribution style of the target functional tool.

For the description of the effects of the information processing apparatus, electronic device and computer-readable storage medium, please refer to the description of the information processing method, which is not repeated here.

It should be understood that both the above general description and the following detailed description are exemplary and explanatory only, and are not restrictive of the technical solution of the present disclosure.

In order to make the above objects, features and advantages of the present disclosure more obvious and easier to understand, the following is a detailed description of preferred embodiments, with the attached drawings.

BRIEF DESCRIPTION OF DRAWINGS

In order to explain the technical solution of embodiments of the present disclosure more clearly, the following will briefly introduce the drawings needed in the embodiments, which are incorporated into and constitute a part of this specification. These drawings show the embodiments in line with the present disclosure and together with the specification, serve to explain the technical solution of the present disclosure. It should be understood that the following drawings only show some embodiments of the present disclosure, so they should not be regarded as limiting the scope. For ordinary people in the field, other related drawings can be obtained according to these drawings without creative work.

DETAILED DESCRIPTION

Figure 1:
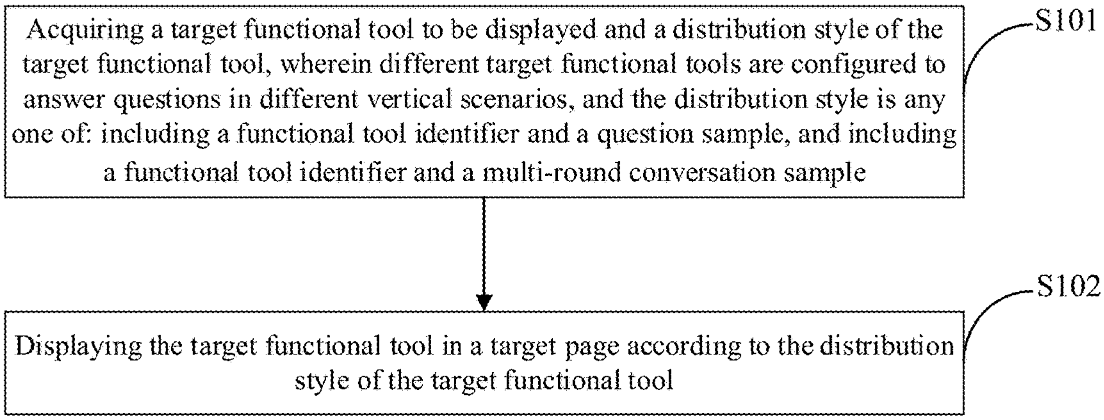
FIG. 1 shows a flowchart of an information processing method provided by an embodiment of the present disclosure.

It can be understood that before using the technical solutions disclosed in various embodiments of the present disclosure, users should be informed of the types, scope of use, use scenarios, etc. of personal information involved in the present disclosure in an appropriate way according to relevant laws and regulations and be authorized by users.

In order to make the purpose, technical solution and advantages of the embodiments of the present disclosure clearer, the technical solution in the embodiments of the present disclosure will be described clearly and completely with the attached drawings. Obviously, described embodiments are only a part of embodiments of the present disclosure, but not the whole embodiments. Components of embodiments of the present disclosure generally described and illustrated herein may be arranged and designed in various different configurations. Therefore, the following detailed description of the embodiments of the present disclosure is not intended to limit the scope of the claimed disclosure, but merely represents selected embodiments of the present disclosure. Based on the embodiments of the present disclosure, all other embodiments obtained by those skilled in the art without creative work belong to the scope of protection of the present disclosure.

Through research, it has been found that generally, there are many functions provided in an application. When users open an application, they can use various different functions provided in the application. However, in the related technologies, the display style of functions is relatively single and messy, especially for some new functions, which results in high usage costs for the users and reduces the use efficiency of the functions.

Based on the above-mentioned research, the present disclosure provides an information processing method, in which a target functional tool to be displayed and a distribution style of the target functional tool are acquired, wherein the distribution style is any one of: including a functional tool identifier and a question sample, and including a functional tool identifier and a multi-round conversation sample; and the target functional tool is displayed in a target page according to the distribution style of the target functional tool, so that a plurality of different distribution styles are provided, improving the diversity of display, and for the target functional tool, a number of question samples or multi-round conversation samples can be displayed to help the user to quickly understand the target functional tool, reducing the use costs and improving the efficiency.

The defects in the above-mentioned solutions are all the results obtained by the inventors after practical and careful study. Therefore, the discovery process of the above-mentioned problems as well as the solutions proposed by the present disclosure below for the above-mentioned problems should be all the contributions made by the inventors to the present disclosure during the process of the present disclosure.

It should be noted that similar reference numerals and letters refer to similar items in the following figures. Thus, once an item is defined in one figure, further discussion and explanation thereof are not required in subsequent figures.

In order to facilitate the understanding of the present embodiment, first, an information processing method disclosed in an embodiment of the present disclosure will be described in detail, and an execution subject of the information processing method provided in the embodiment of the present disclosure is generally an electronic device having a certain computing capability. The electronic device includes, for example, a terminal device or a server or other processing devices. The terminal device may be user equipment (UE), a mobile device, a cellular phone, a cordless phone, a personal digital assistant (PDA), a handheld device, a computing device, a vehicle-mounted device, a wearable device, etc. The personal digital assistant is a handheld electronic device with some functions of the electronic computer, and can be used for managing personal information, browsing the Internet, sending and receiving email, etc. It is generally not provided with a keyboard, and can also be referred to as a palmtop computer. In some possible implementations, the information processing method may be implemented by a processor invoking computer readable instructions stored in a memory.

An information processing method provided by an embodiment of the present disclosure is described below by taking a terminal device being the execution subject as an example.

Referring to FIG. 1, a flowchart of an information processing method provided by an embodiment of the present disclosure is shown, and the method includes the followings:

S101: acquiring a target functional tool to be displayed and a distribution style of the target functional tool, wherein different target functional tools are configured to answer questions in different vertical scenarios, and the distribution style is any one of: including a functional tool identifier and a question sample, and including a functional tool identifier and a multi-round conversation sample.

In the embodiments of the present disclosure, the target functional tool is, for example, an artificial intelligence (AI) tool. With the development of artificial intelligence, more and more AI tools can be realized based on artificial intelligence technology, for example, literary creation, image rendering, character testing, etc. For some new functions, a user may not know how to use and also may not know the effect that can be realized by the AI tool, so the use efficiency is low. Therefore, in the embodiment of the present disclosure, for different AI tools, a plurality of question samples or multi-round conversation samples are automatically generated, thus providing corresponding different distribution styles when the AI tools are distributed in the target page.

For example, when the target functional tool is a gifting guide, the corresponding question sample is, e.g., what is a good gift for a girl child, etc.

Here, in the embodiments of the present disclosure, the number of question samples and the number of multi-round conversation samples in the distribution style is not limited, and may be set according to requirements and experiences.

S102: displaying the target functional tool in a target page according to the distribution style of the target functional tool.

That is, in the embodiments of the present disclosure, according to the distribution styles of different target functional tools, a functional tool identifier and a question sample, or a functional tool identifier and a multi-round conversation sample may be displayed in a target page. In addition, for some target functional tools, for example, the target functional tools that may be more common and more familiar to users, the distribution style thereof may include only the functional tool identifier, and the question sample or the multi-round conversation sample may be not displayed with only the functional tool identifier displayed.

Furthermore, after the question sample or the multi-round conversation sample for the target functional tool is displayed in the target page, a user may also directly click the question sample or the multi-round conversation sample according to requirements, so as to perform a subsequent conversation with the target functional tool. In particular, the present disclosure provides possible embodiments.

In a possible embodiment, in a case of displaying a question sample, the method may include: in response to a selection operation for the question sample corresponding to the target functional tool, displaying a first chat page of the target functional tool, and displaying a selected question sample and a first answer result of the selected question sample in the first chat page, wherein the first answer result is generated based on a generative model after performing semantic analysis on the selected question sample in the vertical scenario corresponding to the target functional tool.

For example, a plurality of target functional tools are displayed in a main page of an application, among which a target functional tool is displayed with a corresponding question sample. When a user needs to use the target functional tool, and is unfamiliar with the target functional tool or does not know how to ask a question to meet the requirements of the target functional tool, the question sample may be selected by clicking, so that the question sample can be sent to the target functional tool, and then a first answer result answered by the target functional tool is displayed in a first chat page of the target functional tool.

In addition, the user may continue to input questions in the first chat page, and the target functional tool may perform a comprehensive analysis on the input questions, or on the input questions and conversation contents before these questions, so as to return corresponding answer results.

In a possible embodiment, in a case of displaying a multi-round conversation sample, the method may include the followings:

1) In response to a selection operation for the multi-round conversation sample corresponding to the target functional tool, a second chat page of the target functional tool is displayed, and a selected multi-round conversation sample is displayed in the second chat page.

In the embodiments of the present disclosure, the multi-round conversation sample includes multiple rounds of questions and answers, and the multi-round conversation sample is displayed to help the user to know about the answering depth, effect, etc., that can be achieved by the target functional tool. The user can have a deeper understanding of the target functional tool. After the user selects the multi-round conversation sample, the complete multi-round conversation sample can be seen in the second chat page, and the question can be further asked on this basis.

2) A question statement input in the second chat page is received.

3) A second answer result of the question statement is acquired, wherein the second answer result is generated based on a generative model after performing statement analysis according to the selected multi-round conversation sample and the question statement in the vertical scenario corresponding to the target functional tool.

That is, in the embodiments of the present disclosure, the selected multi-round conversation sample and the input question statement may both be sent to the generative model, and then the generative model gives an answer for the target functional tool to return a second answer result.

4) The second answer result is displayed in the second chat page.

Of course, after the user selecting a certain multi-round conversation sample, the user gets to know how to use the target functional tool by the multi-round conversation sample, and wants to ask questions in other aspects, then the selected multi-round conversation sample and the input question statement are both sent to the generative model. Then, when the generative model recognizes that the input question statement is not related to the multi-round conversation sample, the generative model only gives an answer for the input question statement, which can improve the accuracy of the answer and better meet the actual needs of the user.

In an embodiments of the present disclosure, a target functional tool to be displayed and a distribution style of the target functional tool are acquired, wherein the distribution style is any one of: including a functional tool identifier and a question sample, and including a functional tool identifier and a multi-round conversation sample; and the target functional tool is displayed in a target page according to the distribution style of the target functional tool, so that when the target functional tool needs to be distributed on the target page, a plurality of different distribution styles are provided, improving the diversity of display, and for the target functional tool, a number of question samples or a number of multi-round conversation samples can be displayed to help the user to quickly understand the target functional tool, reducing the use costs and improving the efficiency.

Further, in the embodiments of the present disclosure, when distributing a target functional tool in a target page, possible embodiments are also provided on how to determine and generate the question sample and the multi-round conversation sample in the distribution style for the distributed target functional tool, and are specifically described below.

For the generation ways of the question samples, the present disclosure provides possible embodiments, including the followings:

1) In response to a functional feature of the target functional tool and/or a familiarity degree of the target functional tool meeting a question prompt condition, a question prompt statement for the target functional tool is acquired according to a vertical scenario corresponding to the target functional tool, wherein the question prompt statement is configured to indicate a question requirement and a reference question sample in the vertical scenario.

For example, a target functional tool in a certain vertical scenario is customized, but a new function may be realized, or a tool name cannot intuitively reflect what the target functional tool is, etc. Therefore, in the embodiments of the present disclosure, a corresponding question sample can be generated for such a target functional tool.

Furthermore, for different target functional tools, corresponding question prompt statements can be determined, and the question prompt statements of different target functional tools are different.

For example, the target functional tool is an AI assistant, which corresponds to a comprehensive scenario, usually corresponding to a main conversation flow of an application. The vertical scenario corresponding to the AI assistant may be various. Then the question prompt statement of the AI assistant may include indicating that the generative model fully considers different use purposes of users. For example, someone wants to complete a creation, some wants to learn some knowledge, someone wants to draw an image, or some wants to chat. It should not focus too much on a certain field. The wider the involved area is, the better. For example, the question prompt statement may also include format requirements of some question samples, etc. For example, it may be an interrogative sentence or a declarative sentence, it shall not more than how many Chinese characters, the beginning can be a little shorter, etc. The question prompt statement may also include a reference question sample, and some better or more common reference question samples may be collected according to experience so as to serve as a positive sample for the generated model to learn.

2) Based on a generative model, the question sample corresponding to the target functional tool is generated with the question prompt statement as an input.

In the embodiments of the present disclosure, the question prompt statement for the target functional tool may be input to the generative model such that the generative model may generate a question sample that conforms to the target functional tool.

For the generation ways of the multi-round conversation sample, the present disclosure provides possible embodiments, including the followings:

1) In response to the target functional tool having an answering depth prompt requirement, and according to a vertical scenario corresponding to the target functional tool, a plurality of chat topics in the vertical scenario corresponding to the target functional tool are acquired, and a target chat topic is selected from the plurality of chat topics.

In the embodiments of the present disclosure, a user may be unfamiliar with how to use a certain target functional tool, or a user knows how to use but does not know the answering depth and effect that this target functional tool can achieve, or the answering depth capability of this target functional tool is good and is to be advertised and displayed to the user to enhance the attractiveness of the target functional tool, etc., then a multi-round conversation sample may be generated for these types of target functional tools.

Moreover, generally, in a vertical scenario corresponding to a certain target function, the question topics that a user wants to consult are also various. For example, a target functional tool for learning knowledge points may involve knowledge points of multiple aspects. Therefore, in the embodiments of the present disclosure, according to requirements, such as popularity, answering depth and effect and so on, one or more target chat topics may be selected from a plurality of chat topics in a vertical scenario corresponding to the target functional tool, so as to generate a multi-round conversation sample under the target chat topic.

2) A conversation prompt statement under the target chat topic is acquired for the target functional tool, wherein the conversation prompt statement is configured to indicate having a conversation under the target chat topic, and a reference conversation sample.

Herein, the conversation prompt statements corresponding to different target chat topics or different target functional tools are also different. In the embodiments of the present disclosure, corresponding conversation prompt statements may be obtained according to the requirements of target chat topics. The reference conversation samples may also be included in the conversation prompt statements so as to improve the learning accuracy of the generative model.

3) Based on a generative model, the multi-round conversation sample under the target chat topic is generated with the conversation prompt statement as an input.

Of course, in the embodiments of the present disclosure, as to which target functional tools require generating question samples and which target functional tools require generating multi-round conversation samples, there is no limitation, and a question sample or a multi-round conversation sample may be generated for both accordingly according to requirements.

Furthermore, in the embodiments of the present disclosure, with regard to different target functional tools, after the question samples or multi-round conversation sample are generated correspondingly, when content distribution needs to be performed in a target page, for example, a user triggers to open a first page of a certain application and requests to acquire information flow in the main page, then the server may determine the target functional tool to be displayed and the distribution style of the tool functional tool to be displayed in the main page, specifically as follows.

Embodiments of the present disclosure also provide possible ways of determining the target functional tool to be displayed, including:

1) Functional tools in an application are acquired.

2) The functional tools are ranked according to a second ranking factor to obtain second ranking information of each of the functional tools, wherein the second ranking information includes at least one of: popularity information, release time information, historical display and use information.

For example, the nearer the release time, the higher the ranking. For example, the higher the popularity, the higher the ranking. For example, the user's usage frequency, usage duration, etc. of each functional tool can be obtained according to some historical displays or usage information, and the higher the usage frequency, the higher the ranking. For another example, in order to improve the awareness of all the functional tools, it is also possible to re-recommend and present all the functional tools to the user after all the functional tools have been consumed by the user, based on the principle of cycle elimination, which means that the functional tools that have not been consumed or displayed by the user will have higher rankings, and that have been consumed will be placed at the bottom.

In the embodiments of the present disclosure, different second ranking factors and ranking rules may also be set according to requirements, which are not limited thereto.

3) A second number of top-ranked target functional tools are selected from the functional tools according to the second ranking information.

In the embodiments of the present disclosure, for example, a certain application may provide many functional tools. However, due to the limited display position of the target page or size of the target page, all the functional tools may not be displayed completely. Therefore, when displaying, all the functional tools may be ranked, so that a second number of top-ranked target functional tools can be selected as the target functional tools to be displayed according to the display region size requirements in the target page, etc. so as to recommend the display to the user. Thus, the displayed target functional tools can be made to better meet the user's requirements and improve the accuracy of the recommended display.

Embodiments of the present disclosure also provide possible ways of determining a question sample or a multi-round conversation sample in a distribution style of a target functional tool, including the followings:

1) In a possible implementation, a preset number of question samples or a preset number of multi-round conversation samples are randomly selected from a plurality of question samples or a plurality of multi-round conversation samples that have been generated as the question samples in a distribution style or the multi-round conversation samples in a distribution style.

In the embodiments of the present disclosure, there may be a plurality of question samples or a plurality of multi-round conversation samples generated based on the generative model. Based on the size of a display area corresponding to the target functional tool, it may not be possible to display all the question samples or multi-round conversation samples, but part of the question samples or multi-round conversation samples may be selected therefrom for display. In a possible implementation of the embodiments of the present disclosure, random selection may be performed for display, which achieves simple implementation and higher efficiency, and also achieves the prompting effect on the target functional tool.

2) In another possible implementation, a plurality of question samples or a plurality of multi-round conversation samples that have been generated are ranked according to a first ranking factor, and according to first ranking information obtained after ranking, a first number of top-ranked question samples or a first number of top-ranked multi-round conversation samples are selected as the question samples in a distribution style or the multi-round conversation samples in a distribution style, wherein the first ranking factor includes at least one of: popularity information, and timeliness information.

In the embodiments of the present disclosure, the question samples or multi-round conversation samples may also be ranked based on the first ranking factor so as to perform a selected display according to the first ranking information after ranking. For example, the higher the popularity information, the higher the ranking; and the nearer the timeliness information, the higher the ranking, etc.

For example, if the target functional tool is a gifting guide, and combined with time information, e.g., when it is almost Valentine's Day, the question samples related to Valentine's Day will have higher popularity information and can be ranked top to be displayed to the user in preference.

As such, in the embodiments of the present disclosure, the question samples or multi-round conversation samples may also be ranked for recommendation display, which may further improve the accuracy of recommendations and increase the likelihood of consumption.

Figure 2:
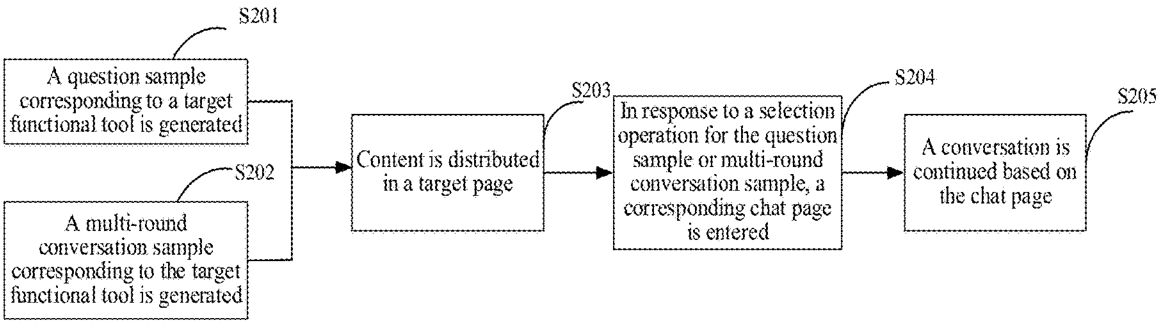
FIG. 2 shows a flowchart of another information processing method provided by an embodiment of the present disclosure.

An information processing method in an embodiment of the present disclosure will be described below using a specific application scenario. Referring to FIG. 2, another information processing method provided in the embodiment of the present disclosure includes the followings:

S201: a question sample corresponding to a target functional tool is generated.

S202: a multi-round conversation sample corresponding to the target functional tool is generated.

In the embodiments of the present disclosure, a question sample or a multi-round conversation sample may be generated for different classes of functional tools.

For example, in response to a functional feature and/or a familiarity degree of the target functional tool meeting a question prompt condition, a question sample corresponding to the target functional tool is generated. As another example, in response to the target functionality tool having an answering depth prompt requirement, a multi-round conversation sample corresponding to the target functionality tool is generated.

S203: content is distributed in a target page.

For example, in response to an information flow distribution event in a target page for an application, such as triggering the opening of the target page, the target functional tool to be displayed and the distribution style of the target functional tool are distributed to a client for display.

S204: in response to a selection operation for the question sample or multi-round conversation sample, a corresponding chat page is entered.

S205: a conversation is continued based on the chat page.

For example, when a user clicks on a question sample of a certain target functional tool or a multi-round conversation sample of a certain target functional tool, a chat page of the target functional tool may be displayed, and then the user may input questions to continue the conversation based on the chat page.

Figure 3A:
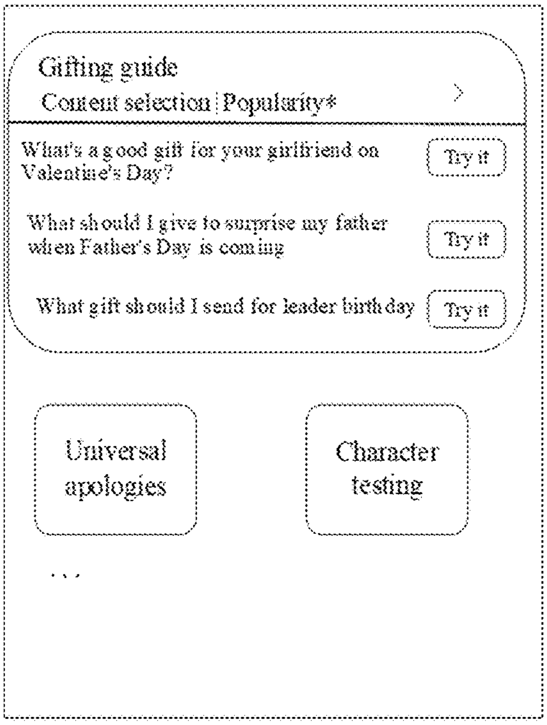
FIG. 3A and FIG. 3B show diagrams illustrating a page display example of an information processing method provided by an embodiment of the present disclosure.
Figure 3B:
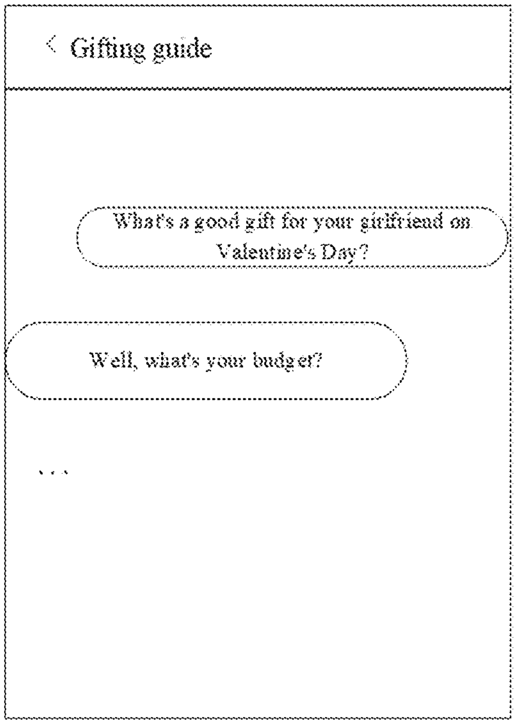

Taking a target functional tool being an AI tool as an example, referring to FIG. 3, a diagram illustrating a page display example of an information processing method in an embodiment of the present disclosure is provided. As shown in FIG. 3, the target functional tools are displayed in a target page, for example, including gifting guide, universal apologies, character testing, etc. The display styles of different AI tools may be the same or different, and different AI tools may correspond to one demonstration module. For example, the AI tools of universal apologies and character testing display respective AI tool identifiers, i.e., names, while the AI tool of gifting guide not only displays an AI tool name, but also displays several question samples to facilitate the user's understanding of how to use the AI tool. For example, as shown in FIG. 3, the gifting guide presents three question samples: What's a good gift for your girlfriend on Valentine's Day? What should I give to surprise my father when Father's Day is coming. What gift should I send for leader birthday? In addition, the AI tool may also display popularity information, icons, etc., and the embodiments of the present disclosure are not limited.

According to the requirements, the user can click to select one of the question samples. For example, the question sample selected by the user is: What's a good gift for your girlfriend on Valentine's Day? Then, it may jump to display a first chat page corresponding to gift guiding, as shown in the right diagram of FIG. 3. The selected question sample is displayed in the first chat page, and a first answer result for the selected question sample may also be displayed. For example, the first answer result is: Well, what's your budget? Thus, the user can continue to speak with the AI in the first chat page to obtain the final desired answer result.

Figure 4A:
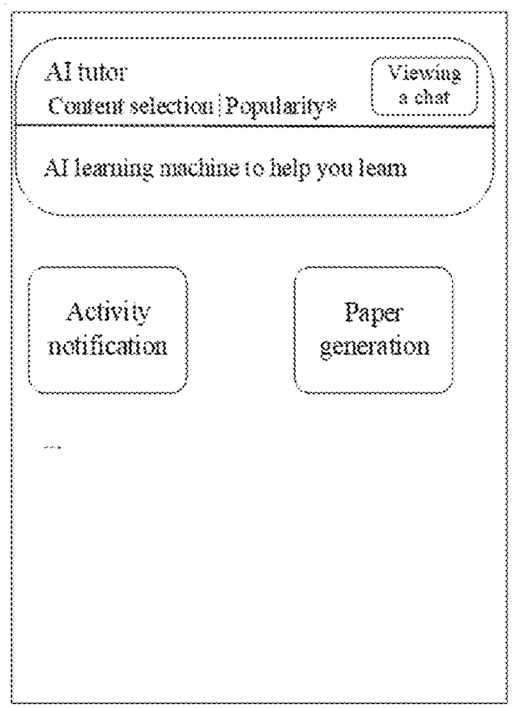
FIG. 4A and FIG. 4B show diagrams illustrating a page display example of another information processing method provided by an embodiment of the present disclosure.
Figure 4B:
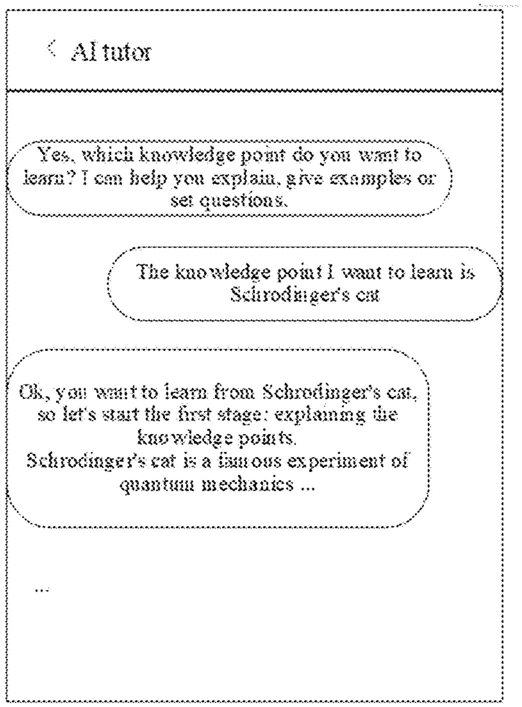

With reference to FIG. 4, a diagram illustrating a page display example of another information processing method in an embodiment of the present disclosure is provided. As shown in FIG. 4, the target functional tools are displayed in a target page, for example, including AI tutor, activity notification, paper generation, etc. The AI tutor also correspondingly displays a multi-round conversation sample. Since the multi-round conversation sample may have more contents and cannot be fully displayed in the target page, in the embodiments of the present disclosure, part of the contents may be displayed firstly in the target page, or a viewing control may be displayed. For example, as shown in FIG. 4, the functional tool of AI tutor correspondingly shows a control for viewing a chat. After clicking the control, a user can jump to a second chat page corresponding to the AI tutor. As shown in the right diagram of FIG. 4, a completed multi-round conversation sample can be shown in the second chat page.

Further, the user can continue the conversation on the basis of the multi-round conversation sample. Specifically, a question statement is input in the second chat page, so that the answer result corresponding to the question statement can be obtained.

In the embodiments of the present disclosure, the distribution styles for different target functional tools can be provided, including providing a question sample or a multi-round conversation sample to be distributed and displayed to a user, improving the diversity of display styles. By the display of the question sample or the multi-round conversation sample, it helps the user to quickly learn and know how to use the target functional tool, improving the use efficiency, and also improving the user's use experience.

It should be noted that the interface diagram in the disclosed embodiments is merely one possible example and should not be construed as limiting the disclosed embodiments.

It will be appreciated by those skilled in the art that the order in which the steps are written in the above-described methods of the specific embodiments does not imply a strict order of execution but rather constitutes any limitation on the implementation, and that the specific order of execution of the steps should be determined both functionally and logically where possible.

Based on the same inventive concept, the embodiment of the present disclosure also provides an information processing apparatus corresponding to the information processing method. Since the principle of solving problems by the apparatus in the embodiment of the present disclosure is similar to the above-mentioned information processing method in the embodiment of the present disclosure, the implementation of the apparatus can refer to the implementation of the method, and the repetition is not repeated here.

In an embodiment of the present disclosure, it at least includes: acquiring a target functional tool to be displayed and a distribution style of the target functional tool, wherein different target functional tools are configured to answer questions in different vertical scenarios, and the distribution style is any one of: including a functional tool identifier and a question sample, and including a functional tool identifier and a multi-round conversation sample; and displaying the target functional tool in a target page according to the distribution style of the target functional tool. In this way, different distribution styles can be provided, so that the diversity of display is enhanced, and the question sample or the multi-round conversation sample is generated for the target functional tool, so that the question sample or the multi-round conversation sample can be displayed in the target page to help the user to quickly understand the target functional tool, reducing the use costs and improving the efficiency.

Figure 5:
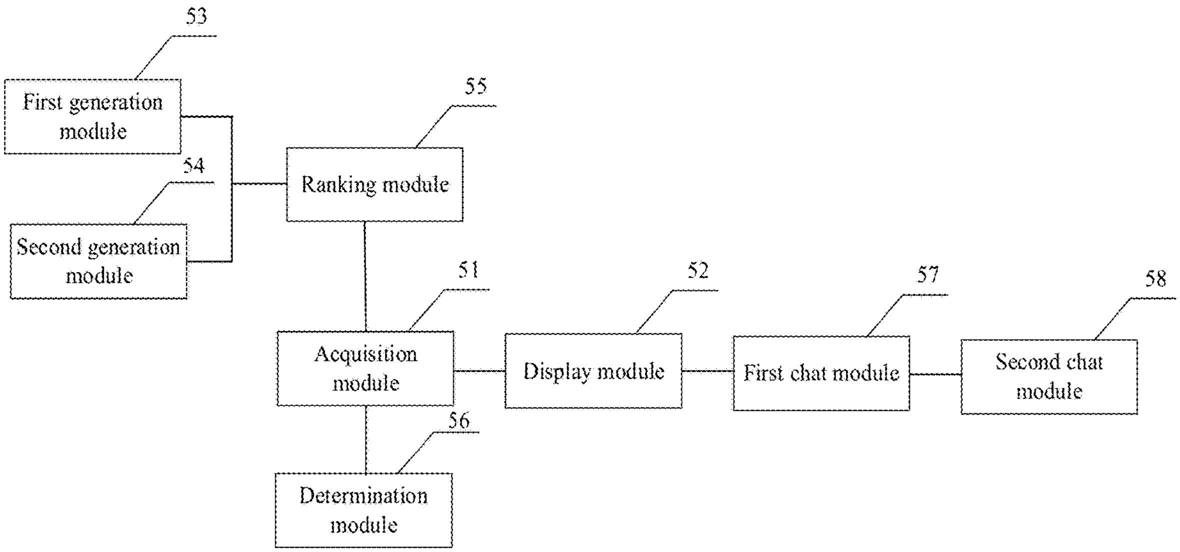
FIG. 5 shows a schematic diagram of an information processing apparatus provided by an embodiment of the present disclosure.

Referring to FIG. 5, it is a schematic diagram of an information processing apparatus provided by an embodiment of the present disclosure, which includes:

an acquisition module 51, configured to acquire a target functional tool to be displayed corresponding to a target page and a distribution style of the target functional tool, wherein different target functional tools are configured to answer questions in different vertical scenarios, and the distribution style is any one of: including a functional tool identifier and a question sample, and including a functional tool identifier and a multi-round conversation sample.

a display module 52, configured to display the target functional tool in the target page according to the distribution style of the target functional tool.

An optional embodiment further includes a first-generation module 53, and the question sample is generated by the first-generation module 53 in the following way:

in response to a functional feature of the target functional tool and/or a familiarity degree of the target functional tool meeting a question prompt condition, acquiring a question prompt statement for the target functional tool according to a vertical scenario corresponding to the target functional tool, wherein the question prompt statement is configured to indicate a question requirement and a reference question sample in the vertical scenario; and based on a generative model, generating the question sample corresponding to the target functional tool with the question prompt statement as an input.

An optional embodiment further includes a second generation module 54, and the multi-round conversation sample is generated by the second generation module 54 in the following way:

in response to the target functional tool having an answering depth prompt requirement, and according to a vertical scenario corresponding to the target functional tool, acquiring a plurality of chat topics in the vertical scenario corresponding to the target functional tool, and selecting a target chat topic from the plurality of chat topics;

acquiring a conversation prompt statement under the target chat topic for the target functional tool, wherein the conversation prompt statement is configured to indicate having a conversation under the target chat topic, and a reference conversation sample; and based on a generative model, generating the multi-round conversation sample under the target chat topic with the conversation prompt statement as an input.

An optional embodiment further includes a ranking module 55, which is configured to:

randomly select a preset number of question samples or a preset number of multi-round conversation samples from a plurality of question samples or a plurality of multi-round conversation samples that have been generated as the question samples in a distribution style or the multi-round conversation samples in a distribution style; or, rank a plurality of question samples or a plurality of multi-round conversation samples that have been generated according to a first ranking factor, and according to first ranking information obtained after ranking, select a first number of top-ranked question samples or a first number of top-ranked multi-round conversation samples as the question samples in a distribution style or the multi-round conversation samples in a distribution style, wherein the first ranking factor includes at least one of: popularity information, and timeliness information.

An optional embodiment further includes a determination module 56, and the target function tool is determined by the determination module 56 in the following way:

acquiring functional tools in an application;

ranking the functional tools according to a second ranking factor to obtain second ranking information of each of the functional tools, wherein the second ranking factor includes at least one of: popularity information, release time information, historical display and use information; and selecting a second number of top-ranked target functional tools from the functional tools according to the second ranking information.

An optional embodiment further includes a first chat module 57, which is configured to:

in response to a selection operation for the question sample corresponding to the target functional tool, display a first chat page of the target functional tool, and display a selected question sample and a first answer result of the selected question sample in the first chat page, wherein the first answer result is generated based on a generative model after performing semantic analysis on the selected question sample in the vertical scenario corresponding to the target functional tool.

An optional embodiment further includes a second chat module 58, which is configured to:

in response to a selection operation for the multi-round conversation sample corresponding to the target functional tool, display a second chat page of the target functional tool, and display a selected multi-round conversation sample in the second chat page;

receive a question statement input in the second chat page;

acquire a second answer result of the question statement, wherein the second answer result is generated based on a generative model after performing statement analysis according to the selected multi-round conversation sample and the question statement in the vertical scenario corresponding to the target functional tool; and display the second answer result in the second chat page.

For the description of the processing flow of each module in the apparatus and the interaction flow between modules, please refer to the relevant description in the above method embodiment, and will not be described in detail here.

Figure 6:
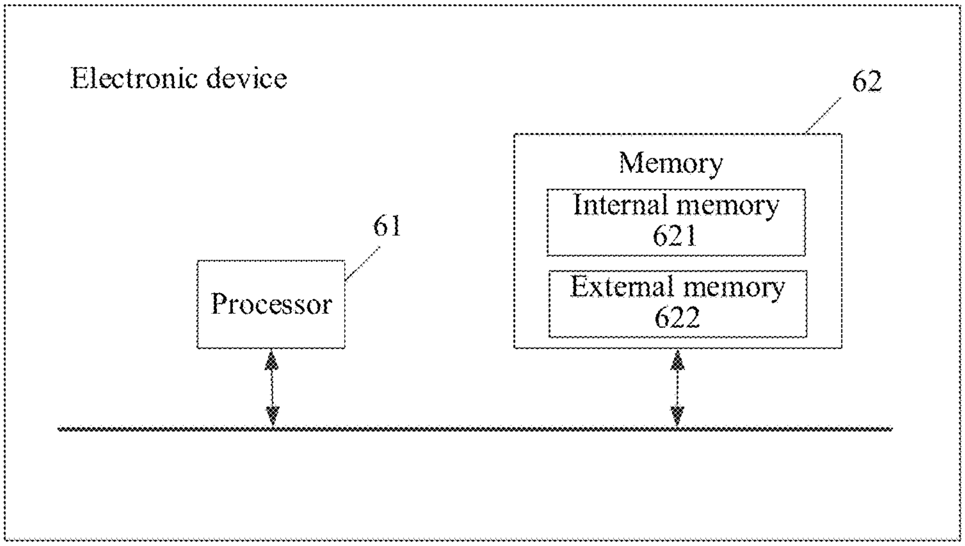
FIG. 6 shows a schematic diagram of an electronic device provided by an embodiment of the present disclosure.

The embodiment of the present disclosure also provides an electronic device, as shown in FIG. 6, which is a schematic diagram of an electronic device provided by an embodiment of the present disclosure, including:

a processor 61, and a memory 62, wherein the memory 62 stores a machine-readable instruction executable by the processor 61, the processor 61 is configured to execute the machine-readable instruction stored in the memory 62, and when the machine-readable instruction is executed by the processor 61, the processor 61 performs the following steps:

acquiring a target functional tool to be displayed and a distribution style of the target functional tool, wherein different target functional tools are configured to answer questions in different vertical scenarios, and the distribution style is any one of: including a functional tool identifier and a question sample, and including a functional tool identifier and a multi-round conversation sample; and displaying the target functional tool in a target page according to the distribution style of the target functional tool.

In an optional embodiment, the question sample is generated by the processor 61 in the following way:

in response to a functional feature of the target functional tool and/or a familiarity degree of the target functional tool meeting a question prompt condition, acquiring a question prompt statement for the target functional tool according to a vertical scenario corresponding to the target functional tool, wherein the question prompt statement is configured to indicate a question requirement and a reference question sample in the vertical scenario; and based on a generative model, generating the question sample corresponding to the target functional tool with the question prompt statement as an input.

In an optional embodiment, the multi-round conversation sample is generated by the processor 61 in the following way:

in response to the target functional tool having an answering depth prompt requirement, and according to a vertical scenario corresponding to the target functional tool, acquiring a plurality of chat topics in the vertical scenario corresponding to the target functional tool, and selecting a target chat topic from the plurality of chat topics;

acquiring a conversation prompt statement under the target chat topic for the target functional tool, wherein the conversation prompt statement is configured to indicate having a conversation under the target chat topic, and a reference conversation sample; and based on a generative model, generating the multi-round conversation sample under the target chat topic with the conversation prompt statement as an input.

In an optional embodiment, the processor 61 is further configured to:

randomly select a preset number of question samples or a preset number of multi-round conversation samples from a plurality of question samples or a plurality of multi-round conversation samples that have been generated as the question samples in a distribution style or the multi-round conversation samples in a distribution style; or, rank a plurality of question samples or a plurality of multi-round conversation samples that have been generated according to a first ranking factor, and according to first ranking information obtained after ranking, select a first number of top-ranked question samples or a first number of top-ranked multi-round conversation samples as the question samples in a distribution style or the multi-round conversation samples in a distribution style, wherein the first ranking factor includes at least one of: popularity information, and timeliness information.

In an optional embodiment, the target function tool is determined by the processor 61 in the following way:

acquiring functional tools in an application;

ranking the functional tools according to a second ranking factor to obtain second ranking information of each of the functional tools, wherein the second ranking factor includes at least one of: popularity information, release time information, historical display and use information; and selecting a second number of top-ranked target functional tools from the functional tools according to the second ranking information.

In an optional embodiment, the processor 61 is further configured to:

in response to a selection operation for the question sample corresponding to the target functional tool, display a first chat page of the target functional tool, and display a selected question sample and a first answer result of the selected question sample in the first chat page, wherein the first answer result is generated based on a generative model after performing semantic analysis on the selected question sample in the vertical scenario corresponding to the target functional tool.

In an optional embodiment, the processor 61 is further configured to:

in response to a selection operation for the multi-round conversation sample corresponding to the target functional tool, display a second chat page of the target functional tool, and display a selected multi-round conversation sample in the second chat page;

receive a question statement input in the second chat page;

acquire a second answer result of the question statement, wherein the second answer result is generated based on a generative model after performing statement analysis according to the selected multi-round conversation sample and the question statement in the vertical scenario corresponding to the target functional tool; and display the second answer result in the second chat page.

The above memory 62 includes an internal memory 621 and an external memory 622. The internal memory 621 herein is also called an internal storage, which is used for temporarily storing computing data in the processor 61 and data exchanged with the external memory 622 such as a hard disk. The processor 61 exchanges data with the external memory 622 through the internal memory 621.

The specific implementation process of the above instruction is described in the steps of the information processing method described in the embodiments of the present disclosure, which is not described again here.

The embodiments of the present disclosure also provide a computer-readable storage medium on which a computer program is stored, and the computer program, when being run by a processor, performs the steps of the information processing method method described in the method embodiments above. The storage medium may be a volatile or non-volatile computer-readable storage media.

The embodiments of the present disclosure also provide a computer program product carrying a program code, and the program code includes an instruction that can be used to perform the steps of the information processing method described in the method embodiments above, which may be referred specifically to the method embodiments above and are not described again herein.

The above-mentioned computer program product can be implemented by means of hardware, software, or a combination thereof. In one optional embodiment, the computer program product is specifically embodied as a computer storage medium, and in another optional embodiment, the computer program product is embodied in a software product, such as a software development kit (SDK) or the like.

It may be apparent to those skilled in the art that, for convenient and simplified description, corresponding processes in the method embodiments above may be referred to for the specific working processes of the system and apparatus described above, which are not described again herein. In several embodiments provided in the present disclosure, it should be understood that the disclosed system, apparatus and method may be implemented by other means. The apparatus embodiments described above are only schematic. In an example, the division of the units is only a logical function division, and they may be divided by other means in the actual implementation. In another example, a plurality of units or components can be combined or can be integrated into another system, or some features can be ignored, or not implemented. On the other hand, the coupling or direct coupling or communication connection between each other shown or discussed may be an electrical, mechanical, or other indirect coupling or communication connection through a communication interface, apparatus or unit.

The unit described as a separated part may be or may not be physically separated, and a part displayed as a unit may be or may not be a physical unit, that is, may be located in a place, or may also be distributed in a plurality of network units. Some or all of these units may be selected according to actual needs to realize the purpose of the present embodiment.

In addition, each functional unit in each embodiment of the present disclosure may be integrated in a processing unit, or each unit may exist separately and physically, or two or more units may be integrated in a single unit.

The described function, if implemented in the form of a software functional unit and marketed or used as a standalone product, may be stored in a non-volatile computer-readable storage medium executable by a processor. Based on this understanding, the technical solution of the present disclosure in essence or the part that contributes to the prior art or the part of the technical solution may be embodied in the form of a software product stored in a storage medium that includes instructions for enabling a computer device (which may be a personal computer, a server, a network device, or the like) to perform all or part of the steps of the method described in each embodiment of the present disclosure. The storage medium above includes: a USB flash drive, a portable hard disk, a read-only memory (ROM), a random access memory (RAM), a magnetic disc or an optical disc, or another medium that can store a program code.

Finally, it should be noted that: the above embodiments are only the specific embodiment of the present disclosure used to illustrate but not limit the technical solutions of the present disclosure. The scope of the present disclosure is not limited thereto. Although the present disclosure has been described in detail with reference to the foregoing embodiments, those of ordinary skill in the art should understand that anyone skilled in the art may easily modify or change the technical solutions described in the foregoing embodiments, or replace equivalently some technical features thereof within the technical scope of the present disclosure, without making the essence of the corresponding technical solutions depart from the spirit and scope of the technical solutions of the embodiments of the present disclosure, which should all been covered in the protection scope of the present disclosure. Therefore, the protection scope of the present disclosure shall be defined only by the claims.

The invention claimed is:

1. An information processing method, comprising:

acquiring a plurality of functional tools to be displayed and a distribution style of each of the plurality of functional tools, wherein each functional tool is one of a plurality of different functional tools configured to automatically generate answers to user questions in different vertical scenarios, and distribution styles of the plurality of functional tools comprising a functional tool identifier and a question sample, and comprising a functional tool identifier and a multi-round conversation sample;

displaying two or more of the plurality of functional tools in a display page according to the distribution style of each of the plurality of functional tools, wherein a distribution style of a first functional tool of the plurality of functional tools comprises either a question sample or a multi-round conversation sample, and wherein a distribution style of a second functional tool of the plurality of functional tools comprises an other one of the question sample or the multi-round conversation sample;

receiving, at a user interface displaying the first functional tool and the second functional tool, a selection of the first functional tool; and displaying a chat page associated with the first functional tool, wherein the first functional tool is configured to receive an input question at the chat page and automatically generate an answer to the input question.

2. The method according to claim 1, wherein the question sample is generated by:

in response to a functional feature of the first functional tool and/or a familiarity degree of the first functional tool meeting a question prompt condition, acquiring a question prompt statement for the first functional tool according to a vertical scenario corresponding to the first functional tool, wherein the question prompt statement is configured to indicate a question requirement and a reference question sample in the vertical scenario; and based on a generative model, generating the question sample corresponding to the first functional tool with the question prompt statement as an input.

3. The method according to claim 1, wherein the multi-round conversation sample is generated by:

in response to the first functional tool having an answering depth prompt requirement, and according to a vertical scenario corresponding to the first functional tool, acquiring a plurality of chat topics in the vertical scenario corresponding to the first functional tool, and selecting a chat topic from the plurality of chat topics;

acquiring a conversation prompt statement under the chat topic for the first functional tool, wherein the conversation prompt statement is configured to indicate having a conversation under the chat topic, and a reference conversation sample; and based on a generative model, generating the multi-round conversation sample under the chat topic with the conversation prompt statement as an input.

4. The method according to claim 2, further comprising: randomly selecting a preset number of question samples or a preset number of multi-round conversation samples from a plurality of question samples or a plurality of multi-round conversation samples that have been generated as the question samples in a distribution style or the multi-round conversation samples in a distribution style.

5. The method according to claim 2, further comprising: ranking a plurality of question samples or a plurality of multi-round conversation samples that have been generated according to a first ranking factor, and according to first ranking information obtained after ranking, selecting a first number of top-ranked question samples or a first number of top-ranked multi-round conversation samples as the question samples in a distribution style or the multi-round conversation samples in a distribution style, wherein the first ranking factor comprises at least one of: popularity information, and timeliness information.

6. The method according to claim 3, further comprising: randomly selecting a preset number of question samples or a preset number of multi-round conversation samples from a plurality of question samples or a plurality of multi-round conversation samples that have been generated as the question samples in a distribution style or the multi-round conversation samples in a distribution style.

7. The method according to claim 3, further comprising: ranking a plurality of question samples or a plurality of multi-round conversation samples that have been generated according to a first ranking factor, and according to first ranking information obtained after ranking, selecting a first number of top-ranked question samples or a first number of top-ranked multi-round conversation samples as the question samples in a distribution style or the multi-round conversation samples in a distribution style, wherein the first ranking factor comprises at least one of: popularity information, and timeliness information.

8. The method according to claim 1, wherein the first functional tool is determined by:

acquiring the plurality of functional tools in an application;

ranking the plurality of functional tools according to a second ranking factor to obtain second ranking information of each of the plurality of functional tools, wherein the second ranking factor comprises at least one of: popularity information, release time information, historical display and use information; and selecting a second number of top-ranked functional tools from the plurality of functional tools according to the second ranking information.

9. The method according to claim 1, further comprising:

in response to receiving the selection of the first functional tool, wherein when the first functional tool comprises a question sample, displaying at least one of a selected question sample and a first answer result of the selected question sample in the chat page, wherein the first answer result is generated based on a generative model after performing semantic analysis on the selected question sample in the vertical scenario corresponding to the first functional tool.

10. The method according to claim 2, further comprising:

in response to receiving the selection of the first functional tool, wherein when the first functional tool comprises a question sample, displaying at least one of a selected question sample and a first answer result of the selected question sample in the chat page, wherein the first answer result is generated based on a generative model after performing semantic analysis on the selected question sample in the vertical scenario corresponding to the first functional tool.

11. The method according to claim 1, further comprising:

in response to receiving the selection of the first functional tool, wherein when the first functional tool comprises a multi-round conversation sample, displaying at least one of a selected multi-round conversation sample in the chat page;

receiving a question statement input in the chat page;

acquiring an answer result of the question statement, wherein the answer result is generated based on a generative model after performing statement analysis according to the selected multi-round conversation sample and the question statement in the vertical scenario corresponding to the first functional tool; and displaying the answer result in the chat page.

12. The method according to claim 3, further comprising:

in response to receiving the selection of the first functional tool, wherein when the first functional tool comprises a multi-round conversation sample, displaying at least one of a selected multi-round conversation sample in the chat page;

receiving a question statement input in the chat page;

acquiring an answer result of the question statement, wherein the answer result is generated based on a generative model after performing statement analysis according to the selected multi-round conversation sample and the question statement in the vertical scenario corresponding to the first functional tool; and displaying the answer result in the chat page.

13. An electronic device, comprising: a processor, and a memory, wherein the memory stores a machine-readable instruction executable by the processor, the processor is configured to execute the machine-readable instruction stored in the memory, and when the machine-readable instruction is executed by the processor, the processor performs steps of an information processing method; and the method comprises:

acquiring a plurality of functional tools to be displayed and a distribution style of each of the plurality of functional tools, wherein each functional tool is one of a plurality of different functional tools configured to automatically generate answers to user questions in different vertical scenarios, and distribution styles of the plurality of functional tools comprising a functional tool identifier and a question sample, and comprising a functional tool identifier and a multi-round conversation sample;

displaying two or more of the plurality of functional tools in a display page according to the distribution style of each of the plurality of functional tools, wherein a distribution style of a first functional tool of the plurality of functional tools comprises either a question sample or a multi-round conversation sample, and wherein a distribution style of a second functional tool of the plurality of functional tools comprises an other one of the question sample or the multi-round conversation sample;

receiving, at a user interface displaying the first functional tool and the second functional tool, a selection of the first functional tool; and displaying a chat page associated with the first functional tool, wherein the first functional tool is configured to receive an input question at the chat page and automatically generate an answer to the input question.

14. The electronic device according to claim 13, wherein the question sample is generated by:

in response to a functional feature of the first functional tool and/or a familiarity degree of the first functional tool meeting a question prompt condition, acquiring a question prompt statement for the first functional tool according to a vertical scenario corresponding to the first functional tool, wherein the question prompt statement is configured to indicate a question requirement and a reference question sample in the vertical scenario; and based on a generative model, generating the question sample corresponding to the first functional tool with the question prompt statement as an input.

15. The electronic device according to claim 13, wherein the multi-round conversation sample is generated by:

in response to the first functional tool having an answering depth prompt requirement, and according to a vertical scenario corresponding to the first functional tool, acquiring a plurality of chat topics in the vertical scenario corresponding to the first functional tool, and selecting a chat topic from the plurality of chat topics;

acquiring a conversation prompt statement under the chat topic for the first functional tool, wherein the conversation prompt statement is configured to indicate having a conversation under the chat topic, and a reference conversation sample; and based on a generative model, generating the multi-round conversation sample under the chat topic with the conversation prompt statement as an input.

16. The electronic device according to claim 14, wherein the method further comprises:

randomly selecting a preset number of question samples or a preset number of multi-round conversation samples from a plurality of question samples or a plurality of multi-round conversation samples that have been generated as the question samples in a distribution style or the multi-round conversation samples in a distribution style.

17. The electronic device according to claim 15, wherein the method further comprises:

ranking a plurality of question samples or a plurality of multi-round conversation samples that have been generated according to a first ranking factor, and according to first ranking information obtained after ranking, selecting a first number of top-ranked question samples or a first number of top-ranked multi-round conversation samples as the question samples in a distribution style or the multi-round conversation samples in a distribution style, wherein the first ranking factor comprises at least one of: popularity information, and timeliness information.

18. A non-transitory computer-readable storage medium storing a computer program, wherein the non-transitory computer program, when executed by a processor, implements steps of an information processing method; and the method comprises:

acquiring a plurality of functional tools to be displayed and a distribution style of each of the plurality of functional tools, wherein each functional tool is one of a plurality of different functional tools configured to automatically generate answers to user questions in different vertical scenarios, and distribution styles of the plurality of functional tools comprising a functional tool identifier and a question sample, and comprising a functional tool identifier and a multi-round conversation sample;

displaying two or more of the plurality of functional tools in a display page according to the distribution style of each of the plurality of functional tools, wherein a distribution style of a first functional tool of the plurality of functional tools comprises either a question sample or a multi-round conversation sample, and wherein a distribution style of a second functional tool of the plurality of functional tools comprises an other one of the question sample or the multi-round conversation sample;

receiving, at a user interface displaying the first functional tool and the second functional tool, a selection of the first functional tool; and displaying a chat page associated with the first functional tool, wherein the first functional tool is configured to receive an input question at the chat page and automatically generate an answer to the input question.

19. The non-transitory computer-readable storage medium according to claim 18, wherein the question sample is generated by:

in response to a functional feature of the first functional tool and/or a familiarity degree of the first functional tool meeting a question prompt condition, acquiring a question prompt statement for the first functional tool according to a vertical scenario corresponding to the first functional tool, wherein the question prompt statement is configured to indicate a question requirement and a reference question sample in the vertical scenario; and based on a generative model, generating the question sample corresponding to the first functional tool with the question prompt statement as an input.

20. The non-transitory computer-readable storage medium according to claim 18, wherein the multi-round conversation sample is generated by:

in response to the first functional tool having an answering depth prompt requirement, and according to a vertical scenario corresponding to the first functional tool, acquiring a plurality of chat topics in the vertical scenario corresponding to the first functional tool, and selecting a chat topic from the plurality of chat topics;

acquiring a conversation prompt statement under the chat topic for the first functional tool, wherein the conversation prompt statement is configured to indicate having a conversation under the chat topic, and a reference conversation sample; and based on a generative model, generating the multi-round conversation sample under the chat topic with the conversation prompt statement as an input.

* * * * *